United States Patent
Shindo (10) Patent No.: US 11,801,424 B2
(45) Date of Patent: Oct. 31, 2023

(54) RUBBER COMPOSITION FOR GOLF BALL CORE, AND GOLF BALL

(71) Applicant: Bridgestone Sports Co., Ltd., Tokyo (JP)

(72) Inventor: Jun Shindo, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 17/645,606

(22) Filed: Dec. 22, 2021

(65) Prior Publication Data

US 2022/0203175 A1 Jun. 30, 2022

(30) Foreign Application Priority Data

Dec. 25, 2020 (JP) .................. 2020-216501

(51) Int. Cl.
*A63B 37/06* (2006.01)
*A63B 37/00* (2006.01)
*C08L 9/00* (2006.01)
*C07F 17/00* (2006.01)
*B29C 45/16* (2006.01)
*B29L 31/54* (2006.01)
*B29K 9/00* (2006.01)

(52) U.S. Cl.
CPC ...... *A63B 37/0051* (2013.01); *A63B 37/0063* (2013.01); *B29C 45/1642* (2013.01); *C07F 17/00* (2013.01); *C08L 9/00* (2013.01); *B29K 2009/00* (2013.01); *B29L 2031/546* (2013.01); *C08L 2205/02* (2013.01)

(58) Field of Classification Search
CPC .................................. A63B 37/0051
USPC ........................................... 473/371
See application file for complete search history.

(56) References Cited

U.S. PATENT DOCUMENTS

| | | | |
|---|---|---|---|
| 6,120,390 A * | 9/2000 | Dalton | B29D 99/0042 473/378 |
| 6,180,722 B1 | 1/2001 | Dalton et al. | |
| 6,332,850 B1 | 12/2001 | Dalton | |
| 6,890,992 B2 | 5/2005 | Dalton | |
| 6,919,395 B2 | 7/2005 | Rajagopalan et al. | |
| 7,172,520 B2 | 2/2007 | Fushihara et al. | |

(Continued)

FOREIGN PATENT DOCUMENTS

JP 4020634 B2 12/2007
JP 2012-180456 A 9/2012
(Continued)

*Primary Examiner* — Raeann Gorden
(74) *Attorney, Agent, or Firm* — Sughrue Mion, PLLC (57) ABSTRACT

A rubber composition for a golf ball core includes (a) a conjugated diene polymer, (b) a multi-component copolymer having conjugated diene units, non-conjugated olefin units and aromatic vinyl units, and (c) an organic peroxide. The conjugated diene units include butadiene units, the non-conjugated olefin units include ethylene units, and the aromatic vinyl units include styrene units. The content of conjugated diene units with respect to the multi-component copolymer is at least 5 wt %. Golf balls having at least one core layer formed of such a rubber composition and a cover of one or more layers encasing the core exhibit improved durability to cracking on repeated impact while maintaining the basic properties required of golf balls, such as flight and spin controllability on approach shots.

9 Claims, 1 Drawing Sheet

(56) References Cited

U.S. PATENT DOCUMENTS

| | | |
|---|---|---|
| 9,884,226 B2 | 2/2018 | Okabe et al. |
| 2003/0092510 A1* | 5/2003 | Iwami ................ A63B 37/0092 |
| | | 473/378 |
| 2014/0005296 A1 | 1/2014 | Horikawa et al. |
| 2018/0282456 A1* | 10/2018 | Horikawa ................ C08L 9/06 |
| 2018/0291185 A1 | 10/2018 | Horikawa et al. |
| 2020/0206576 A1 | 7/2020 | Takihara et al. |

FOREIGN PATENT DOCUMENTS

| | | |
|---|---|---|
| JP | 6366387 B2 | 8/2018 |
| JP | 6408811 B2 | 10/2018 |
| JP | 6602150 B2 | 11/2019 |
| JP | 2020-103339 A | 7/2020 |
| JP | 6780827 B2 | 11/2020 |

\* cited by examiner

RUBBER COMPOSITION FOR GOLF BALL CORE, AND GOLF BALL

CROSS-REFERENCE TO RELATED APPLICATION

This non-provisional application claims priority under 35 U.S.C. § 119(a) on Patent Application No. 2020-216501 filed in Japan on Dec. 25, 2020, the entire contents of which are hereby incorporated by reference.

TECHNICAL FIELD

The present invention relates to a rubber composition for a golf ball core and to a golf ball in which such a composition is used. More particularly, the invention relates to a rubber composition for golf balls which can be suitably used as a core material in golf balls having a core of one or more layer and a cover of one or more layer, and relates also to a golf ball in which such a composition is used.

BACKGROUND ART

Most golf balls nowadays are either two-piece solid golf balls or three-piece solid golf balls. These golf balls generally have a construction in which a single-layer or multilayer cover made of various resin materials encases a core made of a rubber composition. The core accounts for most of the golf ball volume and exerts a large influence on ball properties such as rebound, feel at impact and durability. In a number of recent disclosures in the art, the cross-sectional hardness of the core is suitably adjusted so as to achieve a singular core hardness gradient, thereby optimizing the spin properties of the ball on full shots with a driver or an iron and enabling the ball to travel an increased distance.

A number of technical disclosures have been made in which various resin ingredients are included in a golf ball core-forming rubber composition so as to improve the durability of the core. For example, U.S. Pat. Nos. 6,120,390, 6,890,992, 6,332,850 and 6,919,395 describe art that blends such resin ingredients as modified terpolymers of butadiene, modified terpolymers of styrene, nonionic modified polyolefins and metallocene catalyst-polymerized polymers with the base rubber of a golf ball core.

JP No. 4020634 describes a rubber composition that includes a three-component composite made up of a rubber component, a polyolefin component and a nylon component. JP No. 6366387 describes a rubber composition in which an olefin-alkyl (meth)acrylate copolymer has been compounded. JP No. 6408811 describes compounding at least one selected from the group consisting of C9 petroleum resins and C5/C9 copolymer petroleum resins in a rubber composition. JP-A 2020-103339 describes compounding a terpene resin in a rubber composition.

Other relevant art includes that which adds a resin component to a rubber composition in order to improve the moldability. For example, U.S. Pat. No. 6,180,722 describes art that adds a low-melting polymer when compounding a rubber composition for the outer layer of a two-layer core.

However, in the above art relating to golf ball core-forming rubber compositions, there are limitations on the improvement in the durability of the core when the ball is struck, and so there exists a desire for further improvement in the durability at impact.

Among existing art for improving the durability and other properties of rubber compositions, there is JP No. 6602150, which discloses the inclusion of a conjugated diene compound/non-conjugated olefin copolymer in a rubber composition, and JP No. 6780827, which discloses the inclusion of a multi-component polymer containing conjugated diene units, non-conjugated olefin units and aromatic vinyl units in a rubber composition. In addition, JP-A 2012-180456 discloses art that includes a conjugated diene compound/non-conjugated olefin copolymer and a conjugated diene copolymer in a rubber composition. However, the art described in these disclosures is intended to improve properties such as ozone resistance, weather resistance, resistance to crack propagation and failure characteristics (strength and elongation) in certain types of manufactured rubber articles such as tires, conveyor belts, rubber vibration insulators and rubber seismic isolators. It has no relevance to the field of golf ball art in which the required properties include durability to repeated impact and feel at impact, nor is any mention or suggestion whatsoever made therein concerning golf ball cores.

SUMMARY OF INVENTION

It is therefore an object of the present invention to provide a rubber composition for a golf ball core that can improve the durability to cracking on repeated impact while maintaining the basic properties required of a golf ball, such as flight and spin controllability on approach shots. A further object is to provide a golf ball that uses such a rubber composition.

As a result of intensive investigations, I have discovered that by including as the essential ingredients in a rubber composition for a golf ball core: (a) a conjugated diene polymer, (b) a multi-component copolymer having conjugated diene units, non-conjugated olefin units and aromatic vinyl units and (c) an organic peroxide, and by specifying the multi-component copolymer serving as component (b) such that the conjugated diene units include butadiene units, the non-conjugated olefin units include ethylene units, the aromatic vinyl units include styrene units and the content of conjugated diene units with respect to the multi-component copolymer is at least 5 wt %, the hardness difference in the core internal hardness profile can be set at or above a given level while maintaining the desired core hardness and the durability to cracking on repeated impact is excellent.

The reason for the advantageous effects of the invention, although not entirely clear, is conjectured to be as follows. In contrast with the polybutadiene and other conjugated diene polymer base rubbers that have hitherto been used in golf ball cores, by using an organic peroxide to crosslink a multi-component copolymer having conjugated diene units, non-conjugated olefin units and aromatic vinyl units, an olefin such as ethylene is efficiently taken up into the conjugated diene polymer and becomes present as microcrystals. Moreover, owing to the dissipation of energy from the destruction of the intramolecular crystals (microcrystals) when the golf ball deforms at impact, failure of the rubber crosslinked structure at the core interior is prevented, in addition to which, after the golf ball has been struck, the durability performance is repeatedly maintained by regeneration of the olefin microcrystals.

Also, the multi-component copolymer having conjugated diene units, non-conjugated olefin units and aromatic vinyl units that is used in this invention is a conjugated multi-component copolymer and, as mentioned above, gives rise to a crosslinking reaction under the influence of an organic peroxide. That is, because hitherto known non-conjugated multi-component copolymers such as hydrogenated styrenic thermoplastic elastomers have no double bonds on the main chain, peroxide crosslinking with conjugated diene polymers does not proceed efficiently. It is preferable for the conjugated multi-component copolymer used in this invention to be, in particular, a rubber component that includes a multi-component copolymer having conjugated diene units that include butadiene units, non-conjugated olefin units that include ethylene units and aromatic vinyl units that include styrene units.

Accordingly, in a first aspect, the present invention provides a rubber composition for a golf ball core, which composition includes (a) a conjugated diene polymer, (b) a multi-component copolymer having conjugated diene units, non-conjugated olefin units and aromatic vinyl units, and (c) an organic peroxide. The conjugated diene units include butadiene units, the non-conjugated olefin units include ethylene units, and the aromatic vinyl units include styrene units. The content of conjugated diene units with respect to the multi-component copolymer is at least 5 wt %.

In a preferred embodiment of the rubber composition of the invention, component (a) is one or more selected from the group consisting of polybutadiene rubber, styrene-butadiene rubber, isoprene rubber and natural rubber. Component (a) is more preferably polybutadiene rubber.

In another preferred embodiment of the inventive rubber composition, the content of conjugated diene units with respect to the multi-component copolymer serving as component (b) is at least 10 wt %.

In yet another preferred embodiment, the content of non-conjugated olefin units with respect to the multi-component copolymer serving as component (b) is 9 wt % or less.

In still another preferred embodiment, the content of aromatic vinyl units with respect to the multi-component copolymer serving as component (b) is 30 wt % or less.

In a further preferred embodiment, the multi-component copolymer serving as component (b) is a copolymer polymerized with a gadolinium metallocene complex catalyst.

In a yet further preferred embodiment, the rubber composition further includes (d) an α,β-unsaturated carboxylic acid and/or a metal salt thereof.

In a still further preferred embodiment, the ratio of component (b) to the combined amount of components (a) and (b) is at least 5 wt %.

In an additional preferred embodiment, the rubber composition has, in a vulcanized form thereof, a hardness difference between a surface and a center of the vulcanizate that is at least 15 on the JIS-C hardness scale.

In a second aspect, the invention provides a golf ball having a core of one or more layers and a cover of one or more layers encasing the core, wherein at least one layer of the core is formed of the rubber composition according to the first aspect of the invention.

In a preferred embodiment of the golf ball according to the second aspect of the invention, the core has, in an internal hardness profile thereof, a hardness difference between a surface and a center of the core that is at least IS on the JIS-C hardness scale.

Advantageous Effects of Invention

When a golf ball in which the rubber composition of the invention has been employed as the golf ball core is struck, the singular crosslinked rubber structure at the core interior is able to prevent core failure and improve durability.

BRIEF DESCRIPTION OF DIAGRAM

DESCRIPTION OF EMBODIMENTS

The objects, features and advantages of the invention will become more apparent from the following detailed description taken in conjunction with the appended diagram.

The inventive rubber composition for a golf ball core includes components (a) to (c) below:

(a) a conjugated diene polymer, (b) a multi-component copolymer having conjugated diene units, non-conjugated olefin units and aromatic vinyl units, and (c) an organic peroxide.

The conjugated diene polymer serving as component (a) is exemplified without particular limitation by polybutadiene rubber, styrene-butadiene rubber, isoprene rubber and natural rubber. One of these may be used alone or two or more may be used together.

It is preferable to use polybutadiene as the conjugated diene polymer. Details on the polybutadiene are as follows.

It is desirable for the polybutadiene to have a cis-1,4-bond content on the polymer chain of at least 60 wt %, preferably at least 80% r, more preferably at least 90 wt %, and most preferably at least 95 wt %. At a cis-1,4-bond content among the bonds on the polybutadiene molecule that is too low, the rebound may decrease.

The polybutadiene has a content of 1,2-vinyl bonds on the polymer chain which is generally not more than 2 wt %, preferably not more than 1.7 wt %, and more preferably not more than 1.5 wt %. At a 1,2-vinyl bond content which is too high, the rebound may decrease.

The polybutadiene has a Mooney viscosity ($ML_{1+4}$ (100° C.)) of preferably at least 20, and more preferably at least 30. The upper limit is preferably not more than 120, more preferably not more than 100, and even more preferably not more than 80. The term "Mooney viscosity" used herein refers to an industrial indicator of viscosity UIS K 6300) measured with a Mooney viscometer, which is a type of rotary plastometer. This value is represented by the unit symbol $ML_{1+4}$ (100° C.), wherein "M" stands for Mooney viscosity, "L" stands for large rotor (L-type) and "1+4" stands for a pre-heating time of 1 minute and a rotor rotation time of 4 minutes. The "100° C." indicates that measurement was carried out at a temperature of 100° C.

The polybutadiene used may be one synthesized with a rare-earth catalyst or a group VIII metal compound catalyst.

Component (b) is a multi-component copolymer having conjugated diene units, non-conjugated olefin units and aromatic vinyl units. This multi-component copolymer is the multi-component copolymer mentioned in JP No. 6780827, and is described below.

Conjugated Diene Units

The multi-component copolymer includes conjugated diene units. The conjugated diene units are structural units from a conjugated diene compound serving as a monomer. Because the multi-component copolymer can be polymerized using a conjugated diene compound as the monomer, compared with copolymers obtained by polymerization using a known non-conjugated diene compound such as EPDM, it has excellent crosslinking properties. Therefore, the multi-component copolymer also has the advantage of being able to further enhance the mechanical properties of rubber compositions and manufactured rubber articles produced therewith.

The conjugated diene compound preferably has from 4 to 8 carbon atoms. Specific examples of conjugated diene compounds include 1,3-butadiene, isoprene, 1,3-pentadiene and 2,3-dimethyl-1,3-butadiene.

The conjugated diene compound serving as a monomer of the multi-component copolymer, from the standpoint of effectively enhancing the failure performance of manufactured rubber articles in which the resulting multi-component copolymer is used, preferably includes at least one monomer selected from the group consisting of 1,3-butadiene and isoprene, more preferably consists solely of at least one monomer selected from the group consisting of 1,3-butadiene and isoprene, and even more preferably consists solely of 1,3-butadiene. That is, the conjugated diene units in this multi-component copolymer preferably include at least one constituent unit selected from the group consisting of 1,3-butadiene units and isoprene units, more preferably consist solely of at least one constituent unit selected from the group consisting of 1,3-butadiene units and isoprene units, and even more preferably consist solely of 1,3-butadiene units.

The multi-component copolymer has a cis-1,4 bond content in the overall conjugated diene units that is preferably at least 50%. At a cis-1,4 bond content in the overall conjugated diene units that is at least 50%, molecular chain orientation and high-strength structures such as extension crystals readily arise, and so the failure performance of manufactured rubber articles using the resulting multi-component copolymer can be effectively improved. From a similar standpoint, the multi-component copolymer has a cis-1,4 bond content in the overall conjugated diene units that is more preferably at least 70%, even more preferably at least 80%, and still more preferably at least 90%. Such a multi-component copolymer having a high cis-1,4 bond content in the overall conjugated diene units can be obtained by using as the monomers a conjugated diene compound, a non-conjugated olefin compound and an aromatic vinyl compound.

The content of vinyl bonds (1,2-vinyl bonds, 3,4-vinyl bonds, etc.) in the conjugated diene units overall is preferably 30% or less, more preferably 15% or less, even more preferably 10% or less, and still more preferably 6% or less. Also, the content of trans-1,4 bonds in the overall conjugated diene units is preferably 30% or less, more preferably 15% or less, and even more preferably 10% or less.

The respective contents of cis-1,4 bonds, trans-1,4 bonds and vinyl bonds can be determined by the integrated area ratios from $^1$H-NMR and $^{13}$C-NMR measurement results.

The conjugated diene compound may be of one type used alone or two or more types may be used together. That is, the multi-component copolymer may include one type of conjugated diene unit alone or may include two or more types.

The content of conjugated diene units is preferably at least 5 wt %, more preferably at least 10 wt %, and even more preferably at least 15 wt %, of the overall multi-component copolymer. The content of conjugated diene units is preferably 80 wt % or less, more preferably 60 wt % or less, and even more preferably 50 wt % or less, of the overall multi-component copolymer.

At a conjugated diene unit content in excess of 80 wt % of the overall multi-component copolymer, the influence of the conjugated diene units becomes too large, an effective amount of the non-conjugated olefin cannot be introduced into the conjugated diene polymer (a), and the intended improvement in durability is not achieved. At less than 5 wt %, the peroxide crosslinking efficiency with the conjugated diene polymer (a) decreases and the non-conjugated olefin cannot be efficiently introduced, resulting in an inferior durability performance.

Non-Conjugated Olefin Units

The multi-component copolymer includes non-conjugated olefin units. The non-conjugated olefin units are structural units from a non-conjugated olefin compound serving as a monomer. The non-conjugated olefin compound has a number of carbons that is preferably from 2 to 10. Specific examples of non-conjugated olefin compounds include α-olefins such as ethylene, propylene, 1-butene, 1-pentene, 1-hexene, 1-heptene and 1-octene, and heteroatom-substituted alkene compounds such as vinyl pivalate, 1-phenylthioethene and N-vinyl pyrrolidone.

The non-conjugated olefin compound serving as a monomer in the multi-component copolymer, from the standpoint of further reducing the crystallinity of the resulting multi-component copolymer and improving the weather resistance of rubber compositions and golf ball cores using such a multi-component copolymer, is preferably an acyclic non-conjugated olefin compound. This acyclic non-conjugated olefin compound is more preferably an α-olefin, even more preferably an ethylene-containing α-olefin, and still more preferably ethylene alone. In other words, the non-conjugated olefin units in the multi-component copolymer are preferably acyclic non-conjugated olefin units, and the acyclic non-conjugated olefin units are more preferably α-olefin units, and still more preferably ethylene units alone.

The non-conjugated olefin compound may be of one type used alone, or two or more types may be used together. That is, the multi-component copolymer may contain one type of non-conjugated olefin unit, or may contain two or more types.

It is preferable for the content of non-conjugated olefin units to be more than 20 wt % and less than 90 wt % of the overall multi-component copolymer. At a non-conjugated olefin unit content greater than 90 wt % of the overall multi-component copolymer, the influence of the non-conjugated olefin units becomes too large and the peroxide crosslinking efficiency with the conjugated diene polymer (a) decreases; hence, the non-conjugated olefin cannot be efficiently introduced, resulting in an inferior durability performance. At a non-conjugated olefin unit content of less than 20 wt %, an effective amount of the non-conjugated olefin cannot be introduced into the conjugated diene polymer (a), and so the intended improvement in durability is not achieved.

The content of non-conjugated olefin units is preferably from 30 to 85 wt %, more preferably from 40 to 80 wt %, and even more preferably from 45 to 75 wt %.

Aromatic Vinyl Units

The multi-component copolymer includes aromatic vinyl units. The aromatic vinyl units are structural units from an aromatic vinyl compound serving as a monomer. The aromatic vinyl compound has a vinyl group directly bonded to the aromatic ring, and preferably has from 8 to 10 carbon atoms. Specific examples of aromatic vinyl compounds include styrene, o-methylstyrene, m-methylstyrene, p-methylstyrene, o,p-dimethylstyrene, o-ethylstyrene, m-ethylstyrene and p-ethylstyrene.

The aromatic vinyl compound serving as a monomer in the multi-component copolymer, from the standpoint of further lowering the crystallinity of the resulting multi-component copolymer and further enhancing the durability of rubber compositions and golf ball cores using this multi-component copolymer, preferably includes styrene, and more preferably consists entirely of styrene. In other words, the aromatic vinyl units in the multi-component copolymer preferably include styrene units, and more preferably consist entirely of styrene units.

The aromatic rings in the aromatic vinyl units, unless bonded to a neighboring unit, are not included on the copolymer main chain.

The aromatic vinyl compound may be of one type used alone, or two or more types may be used together. That is, the multi-component copolymer may contain one type of aromatic vinyl unit, or may contain two or more types.

It is preferable for the content of aromatic vinyl units to be from 3 to 30 wt % of the overall multi-component copolymer. At an aromatic vinyl unit content of less than 3 wt % or more than 30 wt %, the lengths of the non-conjugated olefin moieties on the copolymer cannot be controlled, and so an improvement in durability due to non-conjugated olefin crystals is not achieved. The aromatic vinyl unit content is preferably from 3 to 30 wt %, more preferably from 5 to 25 wt %, and even more preferably from 10 to 20 wt %, of the overall multi-component copolymer.

The number of types of monomers in the multi-component copolymer is not particularly limited, provided that the multi-component copolymer includes conjugated to diene units, non-conjugated olefin units and aromatic vinyl units. The multi-component copolymer may also include constituent units other than conjugated diene units, non-conjugated olefin units and aromatic vinyl units. The content of such other constituent units, from the standpoint of obtaining the desired effects, is preferably not more than 30 wt %, more preferably not more than 20 wt %, and even more preferably not more than 10 wt %, of the overall multi-component copolymer. The absence of any such other constituent units, that is, a content of 0 wt %, is especially preferred.

The multi-component copolymer is, at the very least, a multi-component copolymer having one type of conjugated diene unit, one type of non-conjugated olefin unit and one type of aromatic vinyl unit. Also, from the standpoint of imparting good failure characteristics, the multi-component copolymer is preferably a polymer obtained by polymerization using at least one type of conjugated diene compound, one type of non-conjugated olefin compound and one type of aromatic vinyl compound.

The multi-component copolymer is more preferably a three-component copolymer consisting entirely of one type of conjugated diene unit, one type of non-conjugated olefin unit and one type of aromatic vinyl unit, and is more preferably a three-component copolymer consisting entirely of 1,3-butadiene units, ethylene units and styrene units. Here, "one type of conjugated diene unit" encompasses conjugated diene units of differing bonding modes.

One major feature of the multi-component copolymer is that it contains conjugated diene units, non-conjugated olefin units and aromatic vinyl units and that the main chain consists entirely of non-cyclic structures. When the main chain has cyclic structures, the failure characteristics (especially the elongation at break) decrease. NMR spectroscopy may be used as the chief measurement means for verifying whether the main chain of the multi-component copolymer has cyclic structures. Specifically, when peaks attributable to cyclic structures present on the main chain (e.g., in the case of three-membered rings to five-member rings, peaks appearing at 10 to 24 ppm) are not observed, this indicates that the main chain of the multi-component copolymer consists entirely of non-cyclic structures.

The multi-component copolymer, as described below in the method of preparation therefor, may be synthesized in a single reactor, i.e., by one-shot synthesis, and thus can be prepared by a simplified process.

The multi-component copolymer has a polystyrene-equivalent weight-average molecular weight (Mw) of preferably from 10,000 to 10,000,000, more preferably from 100,000 to 9,000,000, and even more preferably from 150,000 to 8,000,000. By setting the Mw of the multi-component copolymer to at least 10,000, a mechanical strength that is fitting in a material for manufactured rubber articles can be fully achieved; by setting Mw to not more than 10,000,000, a high workability can be maintained.

The above weight-average molecular weight and molecular weight distribution are determined by gel permeation chromatography (GPC) using polystyrene as the reference material.

The chain structure of the multi-component copolymer is not particularly limited and may be suitably selected according to the intended purpose. For example, letting the conjugated diene units be A, the non-conjugated olefin units be B and the aromatic vinyl units be C, the copolymer may be a block copolymer having an Ax-By-Cz (wherein x, y and z are integers of 1 or more) construction, a random copolymer with a construction in which A, B and C are randomly arranged, a tapered copolymer in which a random copolymer and a block copolymer are intermingled, or an alternating copolymer with an (A-B-C)w (wherein w is an integer of 1 or more) construction.

The multi-component copolymer may have a structure in which the conjugated diene units, non-conjugated olefin units and aromatic vinyl units are linearly connected (linear structure), or may have a structure in which at least the conjugated diene units, the non-conjugated olefin units or the aromatic vinyl units are connected so as to form a branched chain (branched structure). In cases where the multi-component copolymer has a branched structure, the branched chain may be made a two-component or multi-component chain (i.e., the branched chain may include at least two from among conjugated diene units, non-conjugated olefin units and aromatic vinyl units). Therefore, even among multi-component copolymers, a multi-component copolymer with a branched structure having a two-component or multi-component branched chain can be clearly distinguished from a conventional graft copolymer in which the main chain and the side chains are each formed of one differing type of unit.

The multi-component copolymer production method, polymerization steps and production conditions such as the polymerization catalyst used may be as described in the specification of JP No. 6780827. It is preferable for the multi-component copolymer to be one polymerized by means of a gadolinium metallocene complex catalyst.

In addition to the rubber ingredients represented by component (a) and component (b), other rubber ingredients that may be compounded include other rubbers such as an ethylene-propylene-diene rubber. The ratio of such other rubber ingredients with respect to the overall rubber is 20 wt % or less, preferably 10 wt % or less, and more preferably 5 wt % or less.

Next, component (c) is an organic peroxide. It is especially suitable to use as this organic peroxide one that has a one-minute half-life temperature of between 110 and 185° C. Illustrative examples of such organic peroxides include dicumyl peroxide (available as Percumyl D from NOF Corporation), 2,5-dimethyl-2,5-di(t-butylperoxy)hexane (available as Perhexa 258 from NOF Corporation), and di(2-t-butylperoxyisopropyl)benzene (available as Perbutyl P from NOF Corporation). Dicumyl peroxide may be preferably used. Other commercial products include Perhexa C-40, Nyper BW, Peroyl L (all products of NOF Corporation), and Luperco 231XL (from AtoChem Co.). The organic peroxide may be of one type used singly or two or more types may be used together.

The content of component (c) per 100 parts by weight of the rubber ingredients represented by components (a) and (b)(also referred to below simply as "the rubber ingredients") is preferably at least 0.1 part by weight, and more preferably at least 0.3 part by weight. The upper limit is preferably not more than 5 parts by weight, more preferably not more than 4 parts by weight, and even more preferably not more than 3 parts by weight.

In addition, the rubber composition may include as component (d); an α,β-unsaturated carboxylic acid and/or a metal salt thereof.

The number of carbon atoms on the α,β-unsaturated carboxylic acid is preferably from 3 to 8. Specific examples include unsaturated carboxylic acids such as acrylic acid, methacrylic acid, maleic acid and fumaric acid. Specific examples of the metals in the metal salts of unsaturated carboxylic acids include zinc, sodium, magnesium, calcium and aluminum. Zinc is especially preferred. Therefore, zinc acrylate is most preferred as the co-crosslinking agent.

The content of component (d) per 100 parts by weight of the rubber ingredients represented by components (a) and (b) is preferably at least at least 10 parts by weight, more preferably at least 15 parts by weight, and even more preferably at least 20 parts by weight. The upper limit is preferably not more than 65 parts by weight, more preferably not more than 60 parts by weight, and even more preferably not more than 55 parts by weight. At a content lower than the above range, the ball may become too son and the rebound may worsen; at a content higher than the above range, the ball may become too hard, worsening the feel at impact and the ball may become brittle, resulting in a poor durability.

The co-crosslinking agent serving as component (d) has an average particle size that is preferably from 3 to 30 μm, more preferably from 5 to 25 μm, and even more preferably from 8 to 15 μm. At an average particle size below 3 μm, the co-crosslinking agent tends to agglomerate within the rubber composition so that the reactivity among the co-crosslinking agent ends up rising and the reactivity between the rubber ingredients falls. As a result, a sufficient golf ball rebound performance may not be obtained. At an average particle size greater than 30 μm, the co-crosslinking agent particles become too large and the variability in the properties of the resulting golf ball increases.

In addition to above components (a) to (c) and optional component (d), various types of additives, including fillers, antioxidants, organosulfur compounds, water and the like, may also be included in the rubber composition of the invention, provided that doing so does not detract from the advantageous effects of the invention.

Zinc oxide, barium sulfate, calcium carbonate and the like may be suitably used as the filler. One of these may be used alone, or two or more may be used together. The amount of filler included per 100 parts by weight of the rubber ingredients may be set to preferably at least 1 part by weight, more preferably at least 3 parts by weight, and even more preferably at least 5 parts by weight. The upper limit may be set to preferably 100 parts by weight or less, more preferably 60 parts by weight or less, and even more preferably 40 parts by weight or less, per 100 parts by weight of the rubber ingredients. Too much or too little filler may make it impossible to obtain a proper weight and a suitable rebound.

The antioxidant is not particularly limited. Examples of suitable antioxidants include 2,2-methylenebis(4-methyl-6-tert-butyl phenol), 4,4-butylidenebis(3-methyl-6-tert-butyl phenol) and 2,2-methylenebis(4-ethyl-f-term-butyl phenol). Examples of commercial products that may be used include Nocrac NS-6, NS-30 and NS-3 (all available from Ouchi Shinko Chemical Industry Co., Ltd.). One of these may be used alone, or two or more may be used together.

The amount of antioxidant included per 100 parts by weight of the rubber ingredients, although not particularly limited, is preferably at least 0.05 part by weight, and more preferably at least 0.1 part by weight. The upper limit is set to preferably not more than 1.0 part by weight, more preferably not more than 0.7 part by weight, and even more preferably not more than 0.4 part by weight. Too much or too little antioxidant may keep a suitable core hardness gradient from being obtained, as a result of which it may not be possible to achieve a suitable rebound, a suitable durability and a suitable spin rate-lowering effect on full shots.

Exemplary organosulfur compounds include, without particular limitation, thiophenols, thionaphthols, diphenylpolysulfides, halogenated thiophenols, and metal salts of these. Specific examples include the zinc salts of pentachlorothiophenol, pentafluorothiophenol, pentabromothiophenol and p-chlorothiophenol, and any of the following having 2 to 4 sulfur atoms; diphenylpolysulfides, dibenzylpolysulfides, dibenzoylpolysulfides, dibenzothiazoylpolysulfides and dithiobenzoylpolysulfides. One of these may be used alone, or two or more may be used together. Of these, the use of diphenylsulfide and/or the zinc salt of pentachlorothiophenol is preferred.

It is recommended that the amount of organosulfur compound included per 100 parts by weight of the rubber ingredients be preferably at least 0.05 part by weight, more preferably at least 0.1 part by weight, and even more preferably at least 0.2 part by weight, and that the upper limit be preferably not more than 3 parts by weight, more preferably not more than 2 pans by weight, and even more preferably not more than 1 part by weight. Including too much organosulfur compound may make the hot-molded rubber composition too soft. On the other hand, including too little may make a rebound-improving effect unlikely.

Water may be included in the rubber composition. The water used is not particularly limited, and may be distilled water or tap water, although the use of distilled water that is free of impurities is especially preferred. The water content per 100 parts by weight of the rubber component is preferably at least 0.1 part by weight, and more preferably at least 0.5 part by weight. The upper limit is preferably not more than 10 parts by weight, more preferably not more than 5 parts by weight, and even more preferably not more than 3 parts by weight. When the water content is too high, the hardness may decrease, as a result of which the desired feel at impact, durability and rebound may not be obtained. On the other hand, when the water content is too low, the desired core hardness profile may not be obtained.

The core can be produced by vulcanizing and curing the rubber composition containing the above ingredients. For example, the core can be produced by using a Banbury mixer, roll mill or other mixing apparatus to intensively mix the rubber composition, subsequently compression molding or injection molding the mixture in a core mold, and curing the resulting molded body by suitably heating it under conditions sufficient to allow the organic peroxide or co-crosslinking agent to act, such as at a temperature of between 100 and 200° C., preferably between 140 and 180° C., for 10 to 40 minutes.

By virtue of the compounding described above, the molded rubber composition for a golf ball, following vulcanization and curing, can have a hardness gradient in which the hardness difference between the surface and center thereof is large. By using this molded rubber composition for a golf ball as a golf ball core, the durability of the golf ball can be increased while maintaining the good spin properties of the ball.

The core has a center hardness on the JIS-C scale which, although not particularly limited, is preferably at least 40, more preferably at least 45, and even more preferably at least 50. The upper limit value is preferably not more than 75, more preferably not more than 70, and even more preferably not more than 65. At a core center hardness outside of this range, the feel at impact may worsen, the durability may decrease, and a spin rate-lowering effect may not be achieved.

The core has a surface hardness on the JIS-C scale which, although not particularly limited, is preferably at least 65, more preferably at least 70, and even more preferably at least 72. The upper limit value is preferably not more than 95, more preferably not more than 90, and even more preferably not more than 88. At a core surface hardness lower than this range, the rebound may decrease and a sufficient distance may not be achieved. On the other hand, at a core surface hardness higher than this range, the feel at impact may become too hard and the durability to cracking on repeated impact may worsen.

The core has a hardness profile in which the hardness difference between the surface and the center is sufficiently large. Specifically, the hardness difference between the core surface A and center B on the JIS-C hardness scale is preferably at least 15, more preferably at least 20, and even more preferably at least 25. The upper limit is preferably not more than 50, more preferably not more than 45, and even more preferably not more than 40. When the hardness difference value is too small, the spin rate-lowering effect on shots with a driver (W#1) may be inadequate and a good distance may not be obtained. On the other hand, when the hardness difference value is too large, the initial velocity of the golf ball on actual shots may decrease and a good distance may not be obtained, or the durability to cracking on repeated impact may worsen. As used herein, "center hardness" refers to the hardness measured at the center of the cross-section obtained by cutting the core in half through the center, and "surface hardness" refers to the hardness measured at the spherical surface of the core. Also, "JIS-C hardness" refers to the hardness measured with the spring-type durometer (JIS-C model) specified in JIS K 6301-1975.

It is preferable for the core hardness gradient to be such that the hardness remains the same or rises but does not decrease from the core center outward to the surface.

It is recommended that the core (hot-molded rubber composition) have a compression hardness (deflection) when subjected to a final load of 1,275 N (130 kgf) from an initial load of 98 N (10 kgf) which, although not particularly limited, is preferably at least 2.0 mm, more preferably at least 2.3 mm, and even more preferably at least 2.5 mm; and which has an upper limit that is preferably not more than 6.0 mm, more preferably not more than 5.5 mm, and even more preferably not more than 5.0 mm. When this value is too large, the core becomes too soft, as a result of which a sufficient spin rate-lowering effect may not be obtained and the rebound may decrease. On the other hand, when the deflection is smaller than the above value, a spin rate-lowering effect may not be obtained and the feel at impact may become hard.

The core has a diameter which, although not particularly limited and dependent also on the layer structure of the golf ball to be manufactured, is preferably at least 30 mm, and more preferably at least 35 mm. The upper limit is preferably not more than 41 mm, and more preferably not more than 40 mm. At a core diameter outside of this range, the initial velocity of the ball may decrease or suitable spin properties may not be obtained.

As mentioned above, the rubber composition is preferably used as a golf ball core. Also, it is preferable for the golf ball of the invention to have a core of one or more layers and a cover of one or more layers.

Next, the cover of one or more layers encasing the above core is described.

The cover material is not particularly limited, although known materials such as various types of ionomer resins, urethane elastomers and the like that are used in golf balls may be suitably used as the cover material.

In order to lower the spin rate of the ball even more, it is especially preferable to use a highly neutralized ionomer material in the layer adjoining the core. Specifically, it is preferable to use a material composed of ingredients (i) to (iv) below: 100 parts by weight of a resin component composed of, in admixture.

(i) a base resin of (i-1) an olefin-unsaturated carboxylic acid random copolymer and/or a metal ion neutralization product of an olefin-unsaturated carboxylic acid random copolymer mixed with (i-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and (ii) a non-ionomeric thermoplastic elastomer
in a weight ratio between 100-0 and 50:50;
(iii) from 5 to 80 parts by weight of a fatty acid and/or fatty acid derivative having a molecular weight of from 228 to 1,500; and
(iv) from 0.1 to 17 parts by weight of a basic inorganic metal compound capable of neutralizing un-neutralized acid groups in components (i) and (iii).
When a mixed material of above ingredients (i) to (iv) is used, it is preferable to employ one in which the acid groups are at least 70% neutralized.

Of the cover, it is preferable for the material making up the outermost layer to be composed primarily of a urethane material, especially a thermoplastic urethane elastomer.

In addition, one or more cover layer (intermediate layer) may be formed between the layer adjoining the core and the outermost cover layer. In this case, it is preferable to use a thermoplastic resin such as an ionomer as the intermediate layer material.

The method used to obtain the cover may be, for example, a method in which, depending on the type of ball being produced, a pre-fabricated single-layer core or multilayer core of two or more layers is placed in a mold and the above mixture is mixed and melted under heating and then injection-molded over the core, thereby encasing the core with the desired cover, in this case, cover production can be carried out in a state where excellent thermal stability, flowability and moldability are ensured, as a result of which the golf ball ultimately obtained has a high rebound and also a good feel at impact and an excellent scuff resistance. Another method that may be used to form the cover involves molding the cover material beforehand into a pair of hemispherical half-cups, enclosing the core with these half-cups, and then molding under applied pressure at between 120° C. and 170° C. for 1 to 5 minutes.

When the cover is a one-layer cover, the thickness of that layer may be set to from 0.3 to 3 mm. When the cover is composed of two layers, the thickness of the outer cover layer may be set to from 0.3 to 2.0 mm and the thickness of the inner cover layer may be set to from 0.3 to 2.0 mm. The cover layers making up the cover each have a Shore D hardness which, although not particularly limited, is preferably at least 40, and more preferably at least 45, but is preferably not more than 70, and more preferably not more than 65.

Numerous dimples may be formed on the surface of the outermost layer of the cover. Also, various types of treatment, such as surface preparation, stamping and painting, may be carried out on the cover.

This invention provides a golf ball in which the above-described rubber composition is used as the material for at least one core layer. The type of golf ball is not particularly limited so long as it has a core and one or more cover layer. For example, the ball may be a solid golf ball such as a two-piece or three-piece solid golf ball in which a solid core is encased by a cover, or a multi-piece golf ball having a construction of three or more layers. The rubber composition may also be used in the core of a wound golf ball having a wound core encased by a single cover layer or by a multi-layer cover of two or more layers.

EXAMPLES

The following Examples and Comparative Examples are provided to illustrate the invention, and are not intended to limit the scope thereof.

Examples 1 to 4, Comparative Examples 1 to 4

Using the rubber compositions made up primarily of polybutadiene shown in Table 1 core compositions are prepared according to the rubber formulations in Examples 1 to 4 and Comparative Examples 1 to 4, following which 15 minutes of vulcanization is carried out at 170° C., thereby producing 38.5 mm diameter cores.

Details on the ingredients mentioned in Table 1 are given below.

Polybutadiene rubber: Available under the trade name "BR 01" from JSR Corporation Zinc oxide: Available under the trade name "Zinc Oxide Grade 3" from Sakai Chemical Co., Ltd.

Antioxidant: A phenolic antioxidant available under the trade name "Nocrac NS-6" from Ouchi Shinko Chemical Industry Co., Ltd.

Zinc acrylate: Available under the trade name "ZN-DA85S" from Nippon Shokubai Co., Ltd. (85% zinc acrylate/15% zinc stearate)

Organosulfur compound: Zinc salt of pentachlorothiophenol, available from Wako Pure Chemical Industries, Ltd.

Organic peroxide: Dicumyl peroxide, available under the trade name "Percumyl D" from NOF Corporation Water: Pure water Copolymers A to C, X and Y in Table 1 are obtained as described below.

Copolymer A

Ninety-five grams of styrene and 400 mL of toluene are added to a thoroughly dried 1,000 mL stainless steel pressure reactor.

Within a glovebox under a nitrogen atmosphere, a glass vessel is charged with 0.17 mmol of mono(bis(1,3-tert-butyldimethylsilyl)indenyl) bis(bis(dimethylsilyl)amido)-gadolinium complex (1,3-[(t-Bu)Me$_2$Si]$_2$C$_9$H$_5$Gd[N(SiHMe$_2$)$_2$]$_2$), 0.187 mmol of dimethylanilinium tetrakis(pentafluorophenyl)borate (Me$_2$NHPhB(C$_6$F$_4$)$_4$) and 1.4 mmol of diisobutylaluminum hydride, and 40 mL of toluene is added to give a catalyst solution. This catalyst solution is added to the stainless steel pressure reactor and the system is heated to 70° C.

Ethylene is then introduced under a pressure of 1.5 MPa into the stainless steel pressure reactor, in addition to which 150 mL of a toluene solution containing 27 g of 1,3-butadiene is introduced into the reactor over a period of 30 minutes and copolymerization is carried out at 70° C. for 6 hours. Next, 150 mL of a toluene solution containing 27 g of 1,3-butadiene is introduced into the reactor over a period of 30 minutes and copolymerization is additionally carried out at 70° C. for 1 hour.

TABLE 1

|  |  |  | Example |  |  |  | Comparative Example |  |  |  |
|---|---|---|---|---|---|---|---|---|---|---|
|  |  |  | 1 | 2 | 3 | 4 | 1 | 2 | 3 | 4 |
| Rubber formulation (pbw) | Component (a) | High-cis polybutadiene rubber | 95 | 95 | 95 | 95 | 100 | 100 | 95 | 95 |
|  | Component (b) | Copolymer A | 5 | 5 | 0 | 0 | 0 | 0 | 0 | 0 |
|  |  | Copolymer B | 0 | 0 | 5 | 0 | 0 | 0 | 0 | 0 |
|  |  | Copolymer C | 0 | 0 | 0 | 5 | 0 | 0 | 0 | 0 |
|  |  | Copolymer X | 0 | 0 | 0 | 0 | 0 | 0 | 5 | 0 |
|  |  | Copolymer Y | 0 | 0 | 0 | 0 | 0 | 0 | 0 | 5 |
|  | Zinc Oxide |  | 12.3 | 13.6 | 13.6 | 13.6 | 13.6 | 12.3 | 13.6 | 13.6 |
|  | Antioxidant |  | 0.1 | 0.1 | 0.1 | 0.1 | 0.1 | 0.1 | 0.1 | 0.1 |
|  | Component (d) | Zinc acrylate | 43 | 40 | 40 | 40 | 40 | 43 | 40 | 40 |
|  | Organosulfur compound |  | 0.5 | 0.5 | 0.5 | 0.5 | 0.5 | 0.5 | 0.5 | 0.5 |
|  | Water |  | 0.5 | 0.5 | 0.5 | 0.5 | 0.5 | 0.5 | 0.5 | 0.5 |
|  | Component (c) | Organic peroxide | 1 | 1 | 1 | 1 | 1 | 1 | 1 | 1 |
| Molecular structure of rubber | Contents within (a) + (b) polymer (wt %) | Butadiene unit content | 96.6 | 96.6 | 95.7 | 98.4 | 100.0 | 100.0 | 95.2 | 95.0 |
|  |  | Ethylene unit content | 2.5 | 2.5 | 3.5 | 1.5 | 0.0 | 0.0 | 4.7 | 3.2 |
|  |  | Styrene unit content | 1.0 | 1.0 | 0.8 | 0.2 | 0.0 | 0.0 | 0.2 | 1.8 |

One milliliter of a 5 wt % isopropanol solution of 2,2'-methylenebis(4-ethyl-6-t-butylphenol)(NS-5) is then added to the stainless steel pressure reactor, stopping the reaction.

Next, the copolymer is separated off using a large amount of methanol and vacuum dried at 50° C., giving Copolymer A.

Copolymer B

Eighty grams of styrene and 600 mL of toluene are added to a thoroughly dried 1,000 mL stainless steel pressure reactor.

Within a glovebox under a nitrogen atmosphere, a glass vessel is charged with 0.25 mmol of mono(bis(1,3-tert-butyldimethylsilyl)indenyl) bis(bis(dimethylsilyl)amido)-gadolinium complex (1,3-[(t-Bu)Me$_2$Si]$_2$C$_9$H$_3$Gd[N(SiHMe$_2$)$_2$]$_2$), 0.275 mmol of dimethylanilinium tetrakis(pentafluorophenyl)borate (Me$_2$NHPhB(C$_6$F$_5$)$_4$) and 1.1 mmol of diisobutylaluminum hydride, and 40 mL of toluene is added to give a catalyst solution. This catalyst solution is added to the stainless steel pressure reactor and the system is heated to 70° C.

Ethylene is then introduced under a pressure of 1.5 MPa into the stainless steel pressure reactor, in addition to which 80 mL of a toluene solution containing 20 g of 1,3-butadiene is introduced into the reactor over a period of t hours and copolymerization is carried out at 70° C. for 8.5 hours.

One milliliter of a 5 wt % isopropanol solution of 2,2'-methylenebis(4-ethyl-6-t-butylphenol)(NS-5) is then added to the stainless steel pressure reactor, stopping the reaction.

Next, the copolymer is separated off using a large amount of methanol and vacuum dried at 50° C., giving Copolymer B.

Copolymer C

Fifteen grams of styrene and 300 mL of toluene are added to a thoroughly dried 1,000 mL stainless steel pressure reactor.

Within a glovebox under a nitrogen atmosphere, a glass vessel is charged with 0.25 mmol of mono(bis(1,3-tert-butyldimethylsilyl)indenyl) bis(bis(dimethylsilyl)amido)-gadolinium complex (1,3-[(t-Bu)Me$_2$Si]$_2$C$_9$H$_5$Gd[N(SiHMe$_2$)$_2$]$_2$), 0.275 mmol of dimethylanilinium tetrakis(pentafluorophenyl)borate (Me$_2$NHPhB(C$_6$F$_5$)$_4$) and 1.2 mmol of diisobutylaluminum hydride, and 40 mL of toluene is added to give a catalyst solution. This catalyst solution is added to the stainless steel pressure reactor and the system is heated to 70° C.

Ethylene is then introduced under a pressure of 1.5 MPa into the stainless steel pressure reactor, in addition to which 500 mL of a toluene solution containing 115 g of 1,3-butadiene is introduced into the reactor over a period of 4 hours and copolymerization is carried out at 70° C. for 5 hours.

One milliliter of a 5 wt % isopropanol solution of 2,2'-methylenebis(4-ethyl-6-t-butylphenol)(NS-5) is then added to the stainless steel pressure reactor, stopping the reaction.

Next, the copolymer is separated off using a large amount of methanol and vacuum dried at 50° C., giving Copolymer C.

Copolymer X

Ten grams of styrene and 600 mL of toluene are added to a thoroughly dried 1,000 mL stainless steel pressure reactor.

Within a glovebox under a nitrogen atmosphere, a glass vessel is charged with 0.25 mmol of mono(bis(1,3-tert-butyldimethylsilyl)indenyl) bis(bis(dimethylsilyl)amido)-gadolinium complex (1,3-[(t-Bu)Me$_2$Si]$_2$C$_9$H$_5$Gd[N(SiHMe$_2$)$_2$]$_2$), 0.275 mmol of dimethylanilinium tetrakis(pentafluorophenyl)borate (Me$_2$NHPhB(C$_6$F$_5$)$_4$) and 1.4 mmol of diisobutylaluminum hydride, and 40 mL of toluene is added to give a catalyst solution. This catalyst solution is added to the stainless steel pressure reactor and the system is heated to 70° C.

Ethylene is then introduced under a pressure of 1.5 MPa into the stainless steel pressure reactor, in addition to which 50 mL of a toluene solution containing 5 g of 1,3-butadiene is introduced into the reactor over a period of 3 hours and copolymerization is carried out at 70° C. for 4 hours.

One milliliter of a 5 wt % isopropanol solution of 2,2'-methylenebis(4-ethyl-6-t-butylphenol)(NS-5) is then added to the stainless steel pressure reactor, stopping the reaction.

Next, the copolymer is separated off using a large amount of methanol and vacuum dried at 50° C., giving Copolymer X.

Copolymer Y

Two hundred twenty grams of styrene and 700 mL of toluene are added to a thoroughly dried 1,000 mL stainless steel pressure reactor.

Within a glovebox under a nitrogen atmosphere, a glass vessel is charged with 0.3 mmol of mono(bis(1,3-tert-butyldimethylsilyl)indenyl) bis(bis(dimethylsilyl)amido)-gadolinium complex (1,3-[(t-Bu)Me$_2$Si]$_2$C$_9$H$_5$Gd[N(SiHMe$_2$)$_2$]$_2$), 0.33 mmol of dimethylanilinium tetrakis(pentafluorophenyl)borate (Me$_2$NHPhB(C$_6$F$_5$)$_4$) and 1.4 mmol of diisobutylaluminum hydride, and 40 mL of toluene is added to give a catalyst solution. This catalyst solution is added to the stainless steel pressure reactor and the system is to heated to 70° C.

Ethylene is then introduced under a pressure of 1.4 MPa into the stainless steel pressure reactor and copolymerization is carried out at 70° C. for 8 hours.

One milliliter of a 5 wt % isopropanol solution of 2,2'-methylenebis(4-ethyl-6-t-butylphenol)(NS-5) is then added to the stainless steel pressure reactor, stopping the reaction.

Next, the copolymer is separated off using a large amount of methanol and vacuum dried at 50° C., giving Copolymer Y.

The ethylene, styrene and butadiene contents (wt %) of Copolymers A to C, X and Y are measured and evaluated as follows.

Ethylene, Styrene and Butadiene Contents

The ethylene, styrene and butadiene contents of Copolymers A to C, X and Y are determined by $^1$H-NMR measurement. The calculated values (wt %) are shown in Table 2.

TABLE 2

|  | A | B | C | X | Y |
|---|---|---|---|---|---|
| Conjugated diene unit content (wt %) | 32 | 14 | 67 | 3 | 0 |
| Non-conjugated olefin unit content (wt %) | 49 | 70 | 29 | 94 | 64 |
| Aromatic vinyl unit content (wt %) | 19 | 16 | 4 | 3 | 36 |
| Weight-average molecular weight (×10$^3$) | 375 | 273 | 423 | 112 | 182 |

Cross-Sectional Hardnesses of Core

The cross-sectional hardnesses at the core surface and center are measured by the following methods for the 38.5 mm diameter cores in each of the above Examples and Comparative Examples.

(1) Surface Hardness of Core

The hardnesses at four random points on the core surface are measured at a temperature of 23±1° C. with a JIS-C durometer by perpendicularly setting the durometer indenter against the spherical surface of the core. The average value of these measurements is treated as the measured value for one core, and the average value for three measured cores is determined. These measurements are presented in Table 4.

(2) Cross-Sectional Hardnesses of Core

The core is cut through the center to obtain a flat cross-section. At a temperature of 23±1° C., the hardness at the center of the hemispherical core and at positions every 2 mm from the center to the surface are measured with a JIS-C durometer by perpendicularly setting the durometer indenter against the flat cross-sectional, thus obtaining the measurements for one core. The average values for three measured cores are determined. These measurements are presented in Table 4.

Compression Hardnesses of Core and Ball

The compression hardnesses (amount of deformation in mm) of the core and the ball when compressed at a velocity of 10 mm/s under a final load of 1,275 N (130 kgf) from an initial load of 98 N (10 kgf) are measured at a temperature of 23±1° C. The average value for 10 measured balls (N=10) is determined.

Isocyanate compound: 4,4'-Diphenylmethane diisocyanate

The durability to impact of the resulting golf ball is evaluated by the following method. The results are presented in Table 4.

The durability of the golf ball is evaluated using an ADC Ball COR Durability Tester produced by Automated Design Corporation (US.). This tester fires a golf ball pneumatically and causes it to consecutively strike two metal plates arranged in parallel. The incident e velocity against the metal plates is set to 43 m/s. The number of shots required for the golf ball to crack is measured, and the average value of the measurements taken for ten golf balls is calculated. Durability indices for the balls in the respective Examples are determined relative to a reference value of 1.00 for the average number of shots required for the ball obtained in Comparative Example 1 to crack and are shown in Table 4.

TABLE 4

|  |  | Example | | | | Comparative Example | | | |
| --- | --- | --- | --- | --- | --- | --- | --- | --- | --- |
|  |  | 1 | 2 | 3 | 4 | 1 | 2 | 3 | 4 |
| Core | Deflection (mm) | 2.51 | 2.91 | 2.85 | 2.98 | 3.06 | 2.83 | 2.83 | 2.74 |
|  | Center hardness (JIS-C) | 69 | 69 | 70 | 68 | 65 | 69 | 69 | 70 |
|  | Surface hardness (JIS-C) | 89 | 86 | 88 | 87 | 86 | 87 | 87 | 88 |
|  | Hardness difference (surface · center) | 20 | 17 | 18 | 19 | 21 | 18 | 18 | 18 |
| Manufactured ball | Diameter (mm) | 42.72 | 42.71 | 42.70 | 42.71 | 42.72 | 42.72 | 42.70 | 42.72 |
|  | Weight (g) | 45.40 | 45.36 | 45.34 | 45.34 | 45.35 | 45.33 | 45.35 | 45.39 |
|  | Deflection (mm) | 2.14 | 2.35 | 2.34 | 2.43 | 2.47 | 2.26 | 2.29 | 2.24 |
| Durability index |  | 1.32 | 1.16 | 1.03 | 1.02 | 0.89 | 1.00 | 0.98 | 1.03 |

Formation of Cover (Intermediate Layer and Outermost Layer

Next, the intermediate layer material (ionomer resin material) shown in Table 3 is injection-molded over the core surface using an injection mold, thereby forming an intermediate layer having a thickness of 1.3 mm and a Shore D hardness of 64. The outermost layer material (urethane resin material) shown in Table 3 is then injection-molded over the above intermediate layer-encased sphere using a different injection mold, thereby forming an outermost layer having a thickness of 0.8 mm and a Shore D hardness of 40.

TABLE 3

| Compounding ingredients (pbw) | Intermediate layer | Outermost layer |
| --- | --- | --- |
| Himilan 1706 | 35 |  |
| Himilan 1557 | 15 |  |
| Himilan 1605 | 50 |  |
| TPU |  | 100 |
| Polyethylene wax |  | 1.0 |
| Isocyanate compound |  | 6.3 |
| Titanium oxide |  | 3.3 |
| Trimethylolpropane | 1.1 |  |

Details on the compounding ingredients in this table are given below.

Himilan 1706, Himilan 1557, Himilan 1605:
  Ionomer resins available from Dow-Mitsui Polychemicals Co., Ltd.
TPU: An ether-type thermoplastic polyurethane available under the trade name "Pandex" from DIC Covestro Polymer, Ltd.; Shore D hardness, 40
Polyethylene wax: Available under the trade name "Sanwax 161P" from Sanyo Chemical Industries, Ltd.

Figure 1:
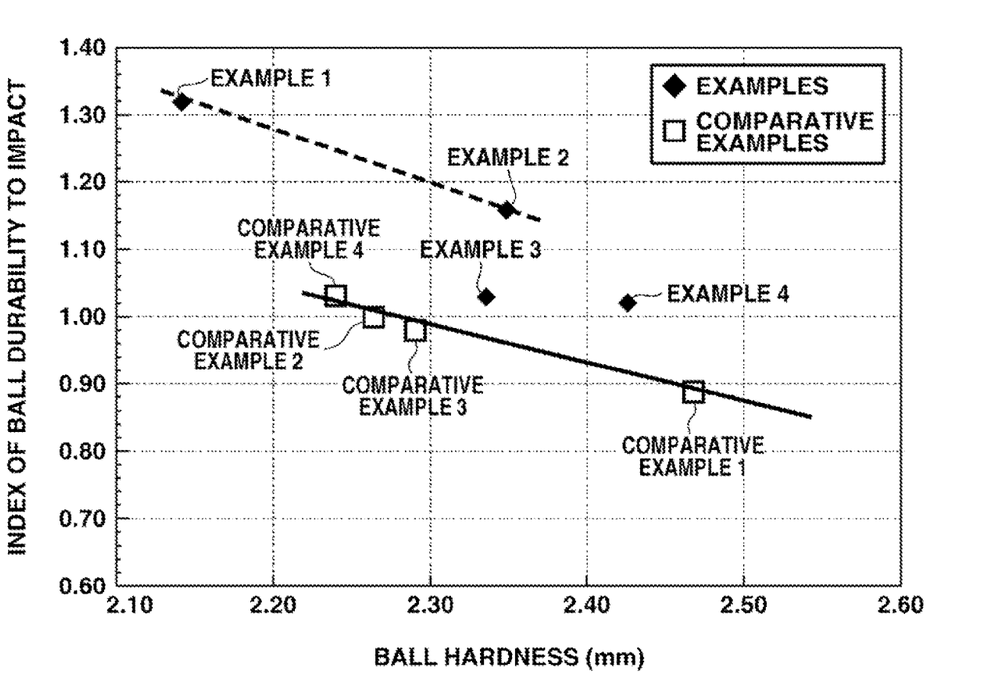
FIG. 1 is a graph showing the relationship between ball deflection and ball durability for the golf balls obtained in the Examples and the Comparative Examples.

From the data in Table 4, the relationship between the ball hardnesses (i.e., the defection of the ball under a given load) and the durability performances in Comparative Examples 1 and 2 in which a high-cis polybutadiene rubber alone is used as the polymer component of the rubber composition is represented by the solid line in FIG. 1. Examples 1 and 2 are examples which contain the same amount of Polymer A, which is a multi-component copolymer of a conjugated diene compound, a non-conjugated olefin and an aromatic vinyl; the relationship between the ball hardnesses and the durability performances in these Examples is indicated by the dashed line in FIG. 1. The dashed line in FIG. 1 is positioned on the high durability index side of the solid line, from which it is to apparent that the durability performance has improved.

In Examples 3 and 4, Polymer B and Polymer C are added instead of Polymer A. These Examples exhibit durabilities on or above the solid line, demonstrating an improvement effect.

On the other hand, in Comparative Example 3 (an Example in which Polymer X is added) and Comparative Example 4 (an Example in which Polymer Y is added), the durabilities are located substantially on the solid line, and so a durability-improving effect is not apparent.

Japanese Patent Application No. 2020-216501 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core of one or more layers and a cover of one or more layers encasing the core, wherein at least one layer of the core is formed of the rubber composition comprising:
   (a) a conjugated diene polymer,
   (b) a multi-component copolymer having conjugated diene units, non-conjugated olefin units and aromatic vinyl units, and
   (c) an organic peroxide,
   wherein the conjugated diene units include butadiene units, the non-conjugated olefin units include ethylene units, the aromatic vinyl units include styrene units, and the content of conjugated diene units with respect to the multi-component copolymer is at least 5 wt %, and wherein the core has, in an internal hardness profile thereof, a hardness difference between a surface and a center of the core that is at least 15 on the JIS-C hardness scale, and
   wherein water is included in the rubber composition and the water content per 100 parts by weight of the rubber component is from 0.1 to 10 parts by weight.

2. The golf ball of claim 1, wherein component (a) is one or more selected from the group consisting of polybutadiene rubber, styrene-butadiene rubber, isoprene rubber and natural rubber.

3. The golf ball of claim 2, wherein component (a) is polybutadiene rubber.

4. The golf ball of claim 1, wherein the content of conjugated diene units with respect to the multi-component copolymer serving as component (b) is at least 10 wt %.

5. The golf ball of claim 1, wherein the content of non-conjugated olefin units with respect to the multi-component copolymer serving as component (b) is 90 wt % or less.

6. The golf ball of claim 1, wherein the content of aromatic vinyl units with respect to the multi-component copolymer serving as component (b) is 30 wt % or less.

7. The golf ball of claim 1, wherein the multi-component copolymer serving as component (b) is a copolymer polymerized with a gadolinium metallocene complex catalyst.

8. The golf ball of claim 1, wherein the rubber composition further comprises (d) an $\alpha,\beta$-unsaturated carboxylic acid or a metal salt thereof or both.

9. The golf ball of claim 1, wherein the ratio of component (b) to the combined amount of components (a) and (b) is at least 5 wt %.

* * * * *